Patented Oct. 24, 1939

2,177,519

UNITED STATES PATENT OFFICE 2,177,519

COMPOSITION AND METHOD FOR PRESERVING THE COLOR OF MEAT

James J. Doyle, Chicago, Ill.

No Drawing. Application January 15, 1936, Serial No. 59,220. Renewed March 28, 1939

12 Claims. (Cl. 99—157)

My invention relates to the preservation of the red color of fresh meat and the natural flavor thereof.

In describing my present invention I apply the term "meat" in its usual restricted sense to mean the flesh, muscles and other edible portions of the carcasses of either mammals or fowl. I am not applying the term "flesh" to include the edible fleshy portion of fish and other aquatic species.

The color of fresh mammalian and avian muscle is due to the presence of natural pigments, i. e., blood hemoglobin and muscle hemoglobin which occur in the occluded capillary blood and muscular tissues respectively. I employ the term "hemoglobin" to refer to these two substances collectively.

Hemoglobin is known to absorb oxygen from the air and to form a more or less unstable substance known as oxyhemoglobin. In this latter substance two additional atoms of loosely bound oxygen are combined with the hemoglobin molecule for each atom of iron present in the molecule. The exact nature of this combination is not known but it is believed that the oxygen combines directly with the iron. In hemoglobin, the iron is present in the acidic portion of the molecule. In the oxyhemoglobin molecule we have a condition apparently in which this portion of the molecule is in the form of a complex ferrate containing hexavalent iron. When a hemoglobin has not lost its property of combining with oxygen, that is, when it is still in the hemoglobin condition, the iron is known to be in a divalent state.

At times and under certain conditions the hemoglobin loses its power of respiration and at such times changes to a greyish color, the coloring appearing in old or exposed meat which may or may not be still in a wholesome condition so far as edibility is concerned. This greyish color is due to a change of the hemoglobin into a different substance of a different color, namely, methemoglobin. In the latter substance the iron is in a trivalent condition. The change to methemoglobin takes place relatively slowly, its rate varying under different conditions. The reactions which occur seem to be somewhat enzymic in character.

The principal object of my invention is to cause meat to retain its normal red color.

Another object is to prevent the hemoglobin or oxyhemoglobin from changing to the methemoglobin form whereby the natural color of the meat will be preserved.

Another object is the provision of an improved method for preserving the color, keeping qualities and sweetness of fresh meat.

Another object is the provision of composition adapted for use in accomplishing the objects set out hereinabove.

Other specific objects, advantages, and features of the invention will be apparent as the detailed description progresses.

It is known that the discoloration of ground or exposed meat is due substantially entirely to the presence of methemoglobin which is formed by the oxidation of ferrous hemoglobin.

When an animal is slaughtered the fleshy part of the meat will be found to have a pH of about 7.4 but the meat gradually becomes somewhat more acid until after a few hours it has a pH of between about 5 and 6. It is this hydrogen ion concentration which favors the formation of the methemoglobin. I have found that neutralization of the acid by suitable means retards the discoloration of the meat by stabilizing the red oxyhemoglobin and preventing the formation of the grey methemoglobin. In this connection, it is to be noted that when the meat is in a single large piece the methemoglobin, the presence of which is shown by the grey color, extends to a depth of only about a few millimeters from the surface. When the meat is ground, however, the greater part of the hemoglobin is oxidized into oxyhemoglobin and the latter substance, being relatively unstable, may change over rather readily into the grey methemoglobin. The difficulty, therefore, is increased considerably in ground meat as compared to unground meat.

In accomplishing the objects of my invention I employ a neutralizing agent, preferably an innocuous alkali metal salt of a weak acid which will be described more in detail hereinafter.

Since changing the pH of the meat in the direction of increasing alkalinity has the tendency to permit the increase of bacterial and enzymic action, I prefer to employ with the neutralizing agent a suitable substance for inhibiting bacterial and enzymic action. This inhibitor is not used in sufficient quantity to have a preserving action on the tissues of the meat itself but only in sufficient quantities to offset the action of the neutralizing agent.

In actual practice, I employ a composition which, in addition to producing a chemical environment unfavorable to the formation of the grey methemoglobin and inhibiting bacterial and enzymic action, also secures other results and advantages. Included in these advantages and functions are the enhancing of the stability of the oxyhemoglobin by the production of a favorable chemical environment; chemically reducing the methemoglobin which may be formed by suitable reducing agents; providing an additional natural reducing agent by enhancing the natural respiratory oxygen consumption of the meat and producing conditions under which the grey color of the methemoglobin is changed to a color more nearly resembling the red color of ferrous hemoglobin.

In reducing the acidity of the meat, I take care that its palatability, wholesomeness and physical soundness are in no sense impaired. I have found that the average pH of slaughtered meat after a few hours standing is about 5.8. I employ a suitable substance having an alkaline reaction to change the pH preferably to at least 6.8 or 7. I have found that the best results are obtained if the pH of the meat after treatment is 7.4. I limit the upper range, however, to pH 8, because if the alkalinity is increased above pH 8 no greater preservation of the color takes place and disadvantages and objections may occur from other standpoints.

I prefer to increase the alkalinity with the smallest possible increase in the total ionic strength. I have found that if the total ionic strength is increased, all other things being equal, the production of methemoglobin tends to be favored slightly. I have obtained my best results by the use of sodium or potassium aluminate which, in the presence of the mild acidity of the natural meat juices, is largely or entirely decomposed into the insoluble aluminum hydroxide and the sodium salts of lactic acid and other acids present in the meat. The presence of this freshly precipitated aluminum hydroxide accomplishes another purpose, namely, helping to inhibit enzymic action in general, due to its absorptive properties toward enzymes. About .3% of sodium aluminate is very effective for the purpose. The percentage range, however, will be explained somewhat more in detail when the finished composition is described.

It is not to be assumed that other alkalis cannot be used with satisfactory results. Other alkali metal salts of weak acids such as trisodium phosphate, disodium phosphate, sodium carbonate, sodium biborate, sodium zincate and the like may also be used. These substances accomplish the purpose of increasing the alkalinity. They do not function quite as satisfactorily, however, as sodium aluminate, as the latter accomplishes the same neutralizing function without the introduction of any foreign acid radicle until a pH well beyond 7 is reached, due, of course, to the insolubility of aluminum hydroxide under the conditions present. The percentage of neutralizing agent in all cases should be such as to change the pH to the range described hereinabove.

In order to inhibit general bacterial and enzymic action which would tend to be increased by decreasing the acidity of the meat, I employ an inhibitor, preferably a mixture of sodium benzoate and alkyl esters of para-hydroxybenzoic acid or alkaline salts thereof. I may use either of these inhibitors alone but find considerable advantage in the combination. In general, the para-hydroxybenzoic acid esters are only slightly soluble while sodium benzoate is readily soluble. The combination, therefore, is advantageous because the sodium benzoate accomplishes some inhibiting, however, during the time required for the more effective but less soluble inhibitor to dissolve, and to diffuse sufficiently to become effective to its full value. The inhibitors are used only in sufficient amount to accomplish the purpose without interfering with the edibility, digestibility and wholesomeness of the meat.

In practice I use between .02% and .08% of the para-hydroxy-benzoic esters and slightly less than .1% of sodium benzoate. It is understood that I may use either of these substances alone, but better results are obtained when the combination is employed.

As an inhibitor, I may, in place of the sodium benzoate, employ sodium salicylate. The meta-hydroxy-benzoic acid esters may be employed in place of the para derivatives but are not so satisfactory because they are somewhat toxic. So, also, sodium and similar derivatives of meta-chlor-benzoic acid may be used but are not preferred for the same reasons. While any of these substances may be used alone, I prefer, as stated, to employ the combination of inhibitors, one being readily soluble and the other somewhat less soluble so that the inhibiting action will be maintained over a somewhat longer period of time.

As an ingredient of the composition which I employ, I utilize a carbohydrate of such character that it will chemically reduce the methemoglobin formed when the meat is allowed to stand in the presence of air and dissolved oxygen. Suitable substances are dextrose, levulose, lactose, maltose or other suitable carbohydrates generally known as reducing sugars. Alkaline salts of lactic acid and similar substances may be used as well as other reducing agents other than sugars or carbohydrates.

For example, products formed in normal metabolic processes such as methyl glyoxal can be used with good results. In general, however, I find considerable advantage in employing readily easily obtainable sugars which may be used in sufficient amounts to accomplish the function desired without affecting the character of the meat adversely.

The amount of carbohydrate material used is sufficient in quantity so that the equilibrium between the sugar and its oxidation products (which in the living animal is continually maintained by the supply of fresh sugar and the withdrawal of its oxidation products) is so maintained as continually to favor further reduction of methemoglobin as long as possible. In practice, I employ about .2 of one per cent or more of dextrose with or without other reducing sugars. I choose these reducing sugars as reducing agents because they have the particularly favorable property of reducing the trivalent iron of methemoglobin, changing the latter into ferrous hemoglobin without interfering with the stability of the hexavalent (ferrate) iron of oxyhemoglobin.

It is, of course, obvious that the introduction of the reducing sugar into the meat tends to form a more nourishing medium for the growth of some forms of bacteria, yeast, molds, or other micro-organisms. The inhibitors described hereinabove function, of course, to prevent or retard bacterial and other action which might tend to be promoted by the provision of a more fertile field. The bacterial inhibitors which I employ are not used in sufficient quantities to nor for the purpose of eliminating the necessity of any part of the regular care and sanitary protection generally accorded by careful persons in the handling of fresh meat; but only for the purpose of compensating for any possible loss of the keeping quality of the meat that might ensue from neutralizing the acidity thereof or adding nourishing sugars as described above.

According to the preferred practice of my invention, I produce a composition according to the following formula:

| | Parts |
|---|---|
| Sodium aluminate | 50 |
| Dextrose | 33 |
| Sodium benzoate | 13 |
| Alkyl esters of para-hydroxy-benzoic acid | 4 |

This composition is prepared in a dry form and all of the ingredients intimately mixed. Approximately ½ to 1% of the composition is employed in the meat, preferably an average of about .625%. The more finely divided the meat, the more of the product may be employed with advantage. In sausage I find that .78% or somewhat more may be used with good results.

The product is introduced in a dry condition when the sausage or other meat is ground, the grinding functioning to produce the satisfactory distribution or dispersion. If the outside surface of cuts of meat is to be protected, a solution of the product or a water suspension or a mixture of both is produced and the outside cut sprayed or treated therewith. It will be noted that, based upon the use of .625% of the composition in the meat, the amount of individual substances actually present is as follows:

| | Per cent |
|---|---|
| Sodium aluminate | .31 |
| Reducing sugar | .21 |
| Sodium benzoate | .08 |
| Para-hydroxy-benzoic esters | .025 |

The preferred range of percentages of substances is:

| | Per cent |
|---|---|
| Sodium aluminate | .3 to .4 |
| Reducing sugar | .2 to .3 |
| Sodium benzoate | .08 to .12 |
| Para-hydroxy-benzoic esters | .02 to .07 |

In making up the composition, the relative proportions of substances by weight with which the best results are obtained are as follows:

| | Per cent |
|---|---|
| Sodium aluminate | .4 to .5 |
| Reducing sugar | .33 to .5 |
| Sodium benzoate | .1 to .15 |
| Esters of para-hydroxy-benzoic esters | .04 to .08 |

It will be noted that each of the substances present in effect acts as a diluent for each of the other substances present, thereby substantially inhibiting the possibility of having too great a concentration of any one substance in particular spots or portions of the meat.

In order still further to avoid this possibility, diluent materials may be used but I find the use of diluents by no means necessary if the composition is carefully compounded.

I may, however, employ some finely ground disodium phosphate to avoid any possibility of having too great a concentration of sodium aluminate in any one spot or portion of the meat. I find that slight increases in proportion of some of the substances in portions of the meat are not apt to be deleterious but that a large concentration of the alkaline material may cause some local difficulty. The use of the disodium phosphate not only reduces the alkalinity of the sodium aluminate slightly but also acts as a buffer against excessive alkalinity such as might be obtained if the user of the product were careless in his mixing. I find, however, that if the composition is carefully compounded the most ordinary care is sufficient and good results will be obtained.

While some of the materials which I may employ in my composition functionally will produce satisfactory results, the use of all substances which will function to produce the result desired is not recommended. It is advisable to select substances which are substantially non-toxic even if employed in relatively large proportions. The substances preferred are particularly the substances listed in the illustrative formulae given hereinabove. These may be used with satisfaction and in the proportions employed are substantially non-toxic and can be employed without any possibility of deleterious results on the human system.

The term "meat" is employed in the following claims with the same meaning as set out in the second paragraph herein.

What I claim as new and desire to protect by Letters Patent of the United States is:

1. The process of retaining the natural color of fresh meat, particularly in comminuted form, which comprises incorporating therewith an alkali metal aluminate to change the hydrogen ion concentration of the meat to a pH of approximately 7.0 to 7.4.

2. The process of retaining the natural color of fresh meat, particularly in comminuted form, which comprises incorporating in the meat a relatively small proportion of an alkali metal salt of a weak acid, and a reducing agent of a class including sugars, alkali metal salts of sugar acids and normal metabolic products of sugars, whereby the hydrogen ion concentration of the meat is changed to a pH of approximately 7.0 to 7.4.

3. The process of retaining the natural color of fresh meat, particularly in comminuted form, which comprises incorporating in the meat a relatively small proportion of an alkali metal salt of a weak acid, a mixture of inhibitors for inhibiting bacterial and enzymic action, and a reducing sugar, whereby the hydrogen ion concentration of the meat is changed to a pH of approximately 7.0 to 7.4.

4. In a process of retaining the natural color of fresh meat, particularly in comminuted form, the steps which comprise incorporating in the meat a substance having an alkaline reaction sufficient in amount to change the pH of the meat to approximately pH 7.0 to 7.4, a proportion of a reducing agent of a class consisting of dextrose, levulose, lactose, maltose, salts of sugar acids, and normal intermediate metabolic products of carbohydrates, whereby to reduce methemoglobin to ferrous hemoglobin, and at least one inhibiting substance for inhibiting bacterial and enzymic action which might be increased due to the presence of the reducing agent.

5. In a process of retaining the natural color of fresh meat, particularly in comminuted form, the steps which comprise incorporating in the meat a substance having an alkaline reaction sufficient in amount to change the pH of the meat to approximately pH 7.0 to 7.4, a proportion of a reducing agent of a class consisting of dextrose, levulose, lactose, maltose, salts of sugar acids, and normal intermediate metabolic products of carbohydrates, whereby to reduce methemoglobin to ferrous hemoglobin, and a relatively small amount of a mixture of sodium benzoate and alkyl or aromatic esters of para-hydroxy-benzoic esters.

6. The process of retaining the natural color of fresh meat, particularly in comminuted form, which comprises incorporating with the meat a relatively small proportion of sodium aluminate to change the pH of the meat to approximately 7.0 to 7.4, a relatively small proportion of a reducing sugar, and a relatively small proportion of a mixture of sodium benzoate and an ester of para-hydroxy-benzoic acid.

7. A composition for retaining the natural color of fresh meat comprising an alkali metal salt of a weak acid, a reducing agent of the class consisting of reducing sugars, alkali metal salts of sugar acids and natural metabolic products of sugars, and a substance for inhibiting bacterial and enzymic action.

8. A composition for retaining the natural color of fresh meat comprising a mixture of sodium aluminate, a reducing sugar and a substance for inhibiting bacterial and enzymic action.

9. A composition for retaining the natural color of fresh meat comprising a mixture of sodium aluminate, a reducing sugar and sodium benzoate.

10. A composition for retaining the natural color of fresh meat comprising a mixture of sodium aluminate, a reducing sugar and an alkyl or aromatic ester of para-hydroxy-benzoic acid.

11. A composition for retaining the natural color of fresh meat comprising a substantially dry intimate mixture of sodium aluminate, dextrose, sodium benzoate and an ester of para-hydroxy-benzoic acid.

12. The process of retaining the natural color of fresh meat which includes the step of introducing therein a compound of aluminum which is capable of decomposition by the dilute acids of meat into aluminum hydroxide, whereby the pH of the meat is changed to approximately 7.0 to 7.4.

JAMES J. DOYLE.